VALVE LIFTER

Original Filed May 8, 1952 4 Sheets-Sheet 1

Inventor
Carl Voorhies
by Parker & Carter.
Attorneys

VALVE LIFTER

Original Filed May 8, 1952 4 Sheets-Sheet 2

Inventor
Carl Voorhies
by Parker & Carter,
Attorneys

VALVE LIFTER

Original Filed May 8, 1952 4 Sheets-Sheet 3

Inventor
Carl Voorhies
by Parker & Carter
Attorneys

VALVE LIFTER

Original Filed May 8, 1952 4 Sheets-Sheet 4

Inventor
Carl Voorhies
by Parker & Carter
Attorneys

United States Patent Office

Re. 24,633
Reissued Apr. 14, 1959

24,633

VALVE LIFTER

Carl Voorhies, Park Ridge, Ill.

Original No. 2,682,865, dated July 6, 1954, Serial No. 286,846, May 8, 1952. Application for reissue November 6, 1958, Serial No. 772,391

17 Claims. (Cl. 123—90)

Matter enclosed in heavy brackets [ ] appears in the original patent but forms no part of this reissue specification; matter printed in italics indicates the additions made by reissue.

This invention relates to a hydraulic tappet or valve lifter.

It has for one object to provide a valve lifter of the hydraulic type in which means are provided for the prevention of lift loss, particularly during starting conditions of the engine in which valve lifters of the type shown are used.

Experience has shown that a substantial amount of check valve travel is advantageous to permit wide opening for starting conditions. When sufficient check valve travel is used in the engine for proper starting, an undesirable lift loss may occur with an engine in connection with which the cam shaft has been designed to operate at or near "zero" tappet clearance.

It is one of the objects of the invention, therefore, to provide a valve lifter so arranged that this lift loss is prevented by holding the check valve in the valve lifter normally against the seat but permitting a wide opening for filling the high-pressure chamber in a valve tappet during starting of the engine.

Another object is to prevent lift loss proportional to the volume displacement.

Other objects will appear from time to time in the course of the specification and claims.

The invention is illustrated more or less diagrammatically in the accompanying drawings, wherein.

Figure 6:
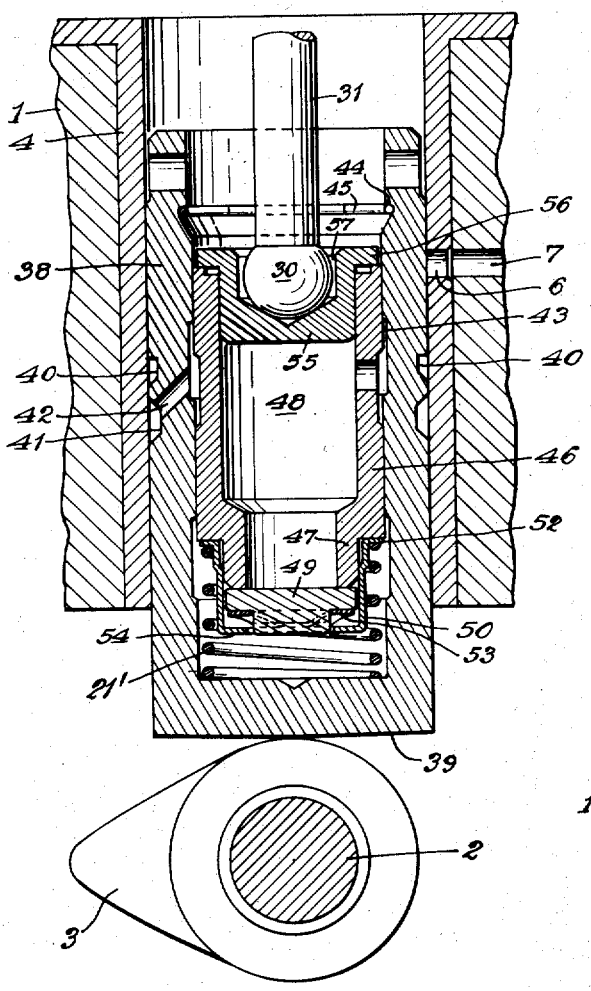
Figure 6 is a view generally similar to Figures 2 and 4 illustrating a further modified form in which modifications in the plunger body and in the spring arrangement have been made.
Figure 14:
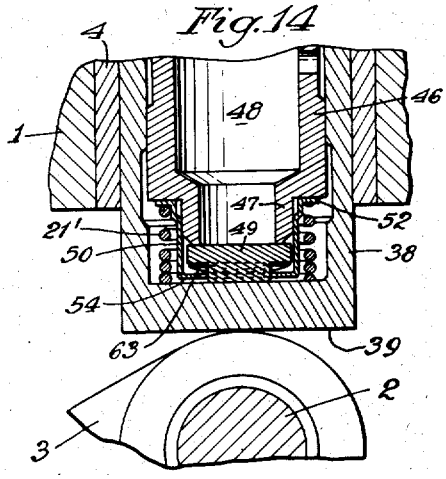

Figure 14 is a section similar to Figure 6 but showing the parts in the innermost position in which the valve portion 24 is in contact with the end 9 of the body 8.

Figure 15:
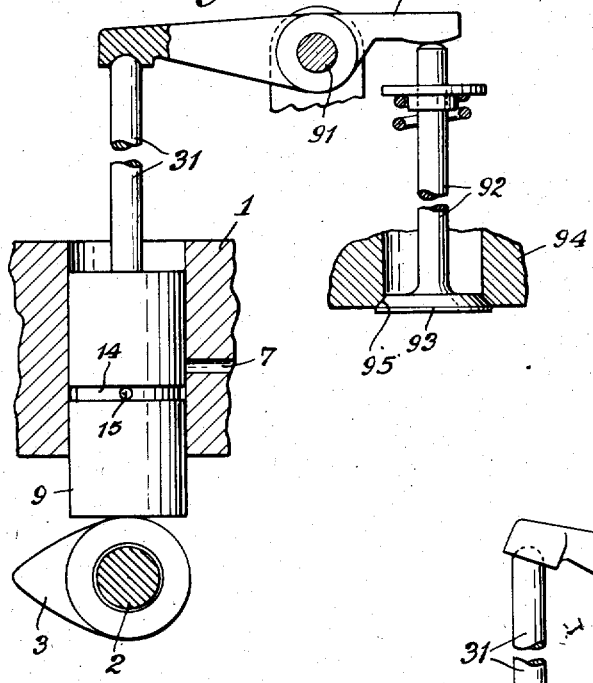

Figure 15 is a side elevation with parts in section showing the passage 7 so arranged that the groove 17' is below the passage 7 when the engine valve is in the closed position as shown in that figure.

Figure 16:
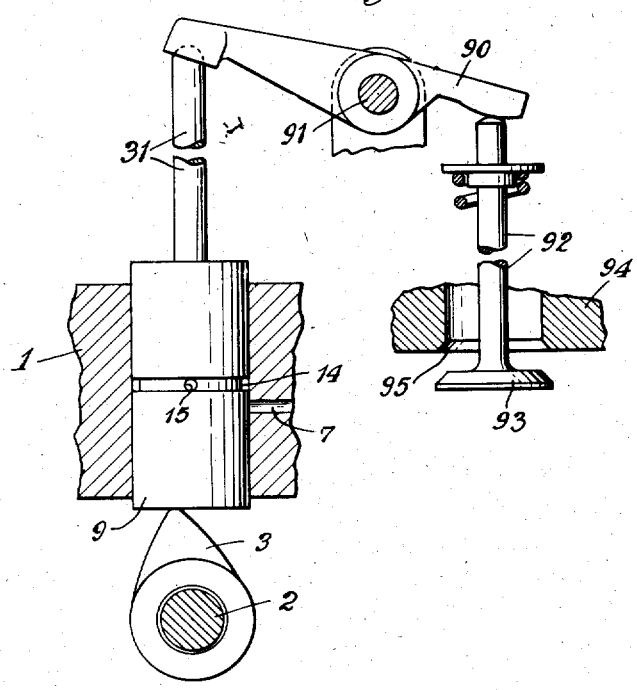

Figure 16 is a view similar to Figure 15 and illustrating the fact that the passage 7 is below the groove 17' when the engine valve is in the open position as shown in that figure.

Figure 15 shows the tappet in its lowest position and Figure 16 shows the tappet in its highest position.

Like parts are indicated by like figures throughout the specification and drawings.

Figure 1:
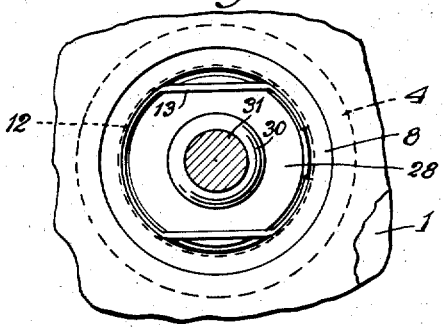
Figure 1 is a plan view of the upper end of the valve lifter in position with the valve operating rod in section.
Figure 3:
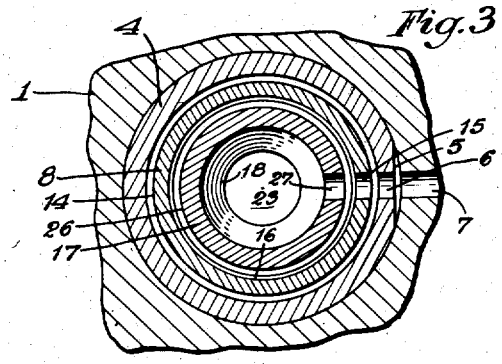
Figure 3 is a section taken at line 3—3 of Figure 2.
Figure 2:
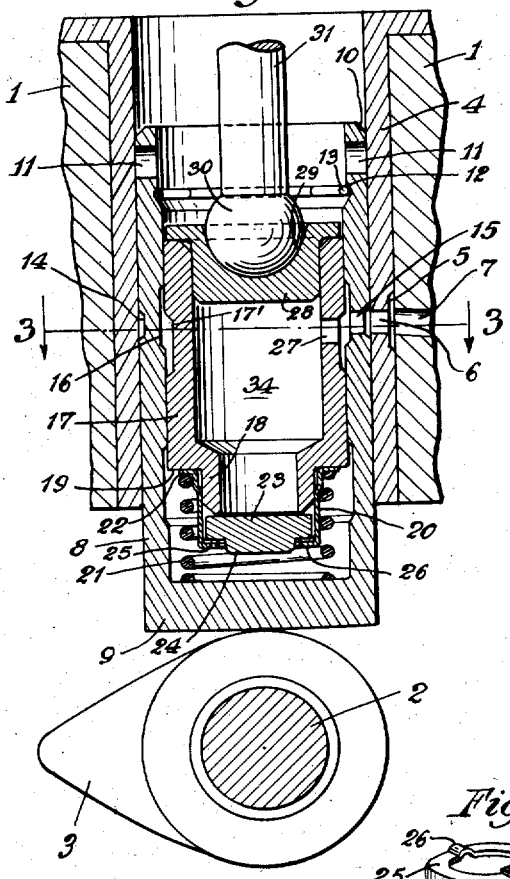
Figure 2 is a longitudinal section of the valve lifter.

In the form of Figures 1 to 3, inclusive, the device is adapted for the pressure feed of fluid into the tappet body and plunger. As shown, 1 is a portion of an engine. Adjacent the engine is positioned a cam shaft 2 carrying cams 3. The engine and the cam shaft and the same are illustrated diagrammatically as their details form no part of the invention. Within the engine portion 1 may be mounted a liner 4. As shown in Figure 2, the liner is provided with a space 5 on its exterior and a perforation or passage 6 is formed in the liner and within the groove 5. A duct or passage 7 communicates with a source of hydraulic fluid and is preferably in line with the passage 6.

A tappet body 8, as shown, is generally cylindrical and fits within the liner 4 for sliding movement with respect to that member. It is closed at its bottom, as at 9, and is open at its top. It may be beveled or reduced as at 10 about its open end. One or more perforations 11 may be formed in the body 8 adjacent its upper end. It is shouldered as at 12 within its open end to receive a retaining ring 13. It is provided at its exterior with a groove 14. 15 is a passage formed through the body and positioned within the groove 14. The tappet body is also provided with an internal groove 16.

A plunger 17 is positioned for sliding movement within the body 8. It is open at both ends and is reduced as at 18, the reduced portion producing an external shoulder 19. A valve retainer 20 is positioned about the reduced portion 18 and bears against the shoulder 19, as shown. A spring 21 is positioned about the reduced portion 18 and about the valve retainer 20 and bears upon a flange 22 of the valve retainer 20. The spring 21 also bears against the closed end 9 of the body 8.

Within the valve retainer is a valve 23 which is reduced as at 24. This valve is held against displacement by the inwardly turned flange 25 of the valve retainer 20. This flange 25 is provided with one or more grooves or depressions 26, as is shown particularly in Figure 5. The clearance between the inward faces of the members 25 and the end of the reduced portion 18 of the valve plunger 17 is sufficient to permit the valve 23 to be moved from contact with the outer end of the reduced portion 18. The tappet plunger 17 is formed on its exterior with a groove 17' which may register with the groove 16 on the interior of the body 8. A perforational passage 27 pierces a wall of the plunger 17 and is more or less in line with the passages 6 and 15. A tappet cap member 28 is positioned within the open end of the plunger 17 and is provided with a hemispherical depression 29 in which the rounded member 30 of the rod 31 may be seated.

The dimensions of the grooves 16 in the cylindrical body 8 and the groove 17' in the plunger 17 are such that their widths are proportioned one to the other and both of them are proportioned to the total travel of the plunger 17 so that when the engine is stopped and the plunger moves down to where the check valve projection rests on the bottom 9 of the body that the bearing surfaces between the plunger and the bore of the body would be clean of any deposits so that during the sliding motion no part of the bearing surface would ride over a deposit permitting the plunger to remain free to return to its original operating position without riding over any exposed surfaces whether of the plunger or of the body.

Figure 4:
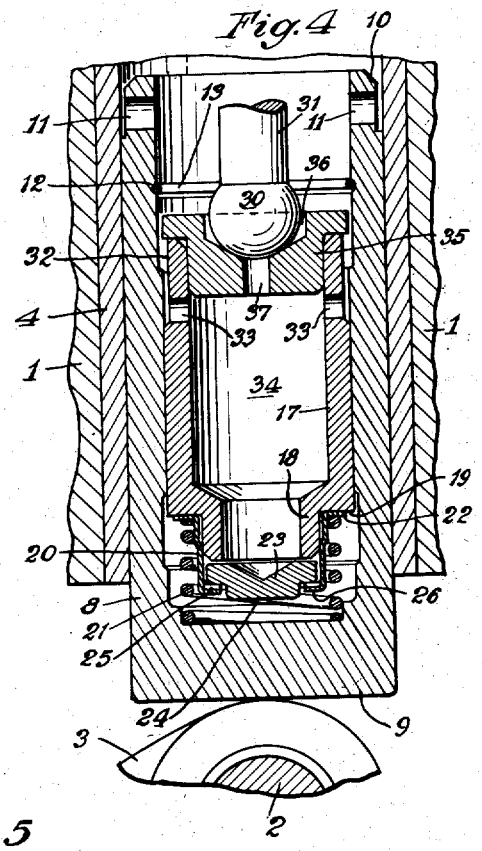
Figure 4 illustrates a modified form of the device suitable for gravity feed.

The use and operation of this invention are as follows:

Figures 2, 4, and 6 illustrate the valve lifter in the position in which the engine valves are closed. This is also true of the modified form of Figure 12. Referring to Figure 2, the spring 21 holds the tappet body 9 against the cam 3 and the plunger is urged upward to where all clearance is taken out of the valve train. Oil from the engine oil supply is fed through passage 7, 6 and 15 through 27 into the reservoir or oil supply chamber 34. When the high pressure chamber below the check valve 23 is filled with oil as the cam revolves and the tappet is lifted, the parts of the valve train are carried on the column of oil in the high pressure chamber. During the time the valve is lifted slight leakage occurs in the clearance between the plunger 17 and the body 18. When the valve closes the spring urges the plunger 17 and the body 8 apart, check valve 24 opens and permits oil to pass from the supply chamber 34 into the high pressure chamber to replenish the supply of oil with the face 9 against the cam 8 and the lash out of the valve train. At the beginning of the rise of the cam, the check valve is closed and the column of oil is trapped in the high pressure chamber.

Figure 12:
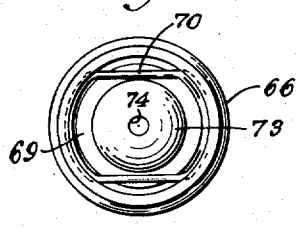
Figure 12 is a plan view of the device of Figure 11.

The operation of the modified forms of the device shown in Figures 4, 6 and 12 is the same as that which is described in connection with the form of the device shown in Figure 2.

When the engine is stopped, a number of the engine valves are in the open position in which case the lifter leaks down to the point where the valve 24 bottoms on the head 9 of the body 8. If now the engine is started, the spring 21 urges the plunger 17 and the body 8 apart. The check valve 24 opens wide to admit oil from reservoir 34 into the high pressure chamber.

The operation of the relatively flat check valve washer spring 53 or 63 is as follows:

It holds the check valve 24 normally in contact with the portion 18 of the plunger 17 and thus closes the passage through the reduced portion 18. It assists Venturi action which occurs between the face of the valve 24 and the projection 18 in closing the valve quickly so that in normal operation the clearance is held closer to zero and a more quiet valve gear results, yet the spring permits wide opening of the valve required as in starting.

In the modified form of the device shown in Figure 4 the construction is generally similar to that shown in the first three figures and described above. The device of this modified form is, however, arranged for use with gravity feed in which the fluid which finds its way into the interior of the valve lifter or tappet does so by gravity rather than by force feed. Thus parts of the assembly which are the same in both cases will not be re-described and carry the same reference numerals as used above.

The liner 4 of Figure 4 is the same as the liner of Figure 2 but it is not provided with the perforations 6. The tappet body 8 is the same as that described above and shown in Figure 2 but it is not provided with external or internal grooves with passages through it except the perforaitons 11 adjacent its open upper end. The plunger 17 is substantially the same as that shown in Figure 2 except that instead of being provided with an external groove 26 it is reduced adjacent its upper end as at 32 and it is provided with one or more perforations 33—33 by means of which communication is established between the reduced portion 32 and the interior of the plunger. It will be noted thus that the plunger 17 is in each form provided with an interior chamber 34. In the case of Figure 2, fluid reaches this chamber by pressure through the sides of the plunger and in the case of Figure 4, fluid reaches the interior of the plunger by gravity. The valve 23, the spring 21, and the valve retainer are the same in both forms of the device and need not be re-described. The cap 35 on Figure 4 differs from the cap 28 of Figure 2. It is provided with a depression or seat 36 within which the rounded member 30 is positioned and a passage 37 leads from the depression or seat 36 to the interior of the plunger.

In the modified form of Figure 6 the tappet or valve lifter assembly appears. The form of the invention shown in that figure comprises a body 38, generally cylindrical and provided with an end-closing member 39. Two grooves 40 and 41 are provided in the exterior of the body 38 and a passage or perforation 42 leads from the lower groove 41 and an internal groove 43 formed within the body 38. The body 38 is shouldered as at 44 to receive a retaining ring 45.

Mounted for movement within the body 38 is a plunger 46 provided with a reduced portion 47 adjacent one end. The plunger 46 is provided with an internal bore or space 48. A valve 49 is arranged to close the open end of the reduced portion 47. A valve retainer 50 similar to or identical with the valve retainers 20 of the earlier figures is positioned about the reduced portion 47 and about the valve 49 and holds the latter aaginst displacement. A spring 21 is similar to or identical with the spring 21 of the earlier figures. It bears at one end against the inner face of the end wall 39 of the body 38 and at its other end bears against a flange 52 of the retainer 50. A spring washer or ring 53 is positioned within the valve retainer 50 and about the outer edge of the valve 49. It is held against displacement by the inturned flange 54 of the valve retainer 50.

The open upper end of the plunger 46 is closed by a cap 55 which is provided with a flange 56 and a depression or seat 57 within which an operating rod similar to or comparable with the rod 31 of the earlier figures may be received. A dual rate spring 21' is used.

In the form of Figure 4 the spring 21 is shown as fitting closely over the retainer 20 and it is also shown as fitting closely into a depression formed in the upper surface of the member 9. The spring is in effect snapped into this depression and is snapped onto the member 20 and its tension is such that substantial friction is created at its points of engagement with the tappet body 8 and the retainer 20 which is relatively tight upon the reduced portion 18 of the plunger 17. The spring in this form because of this relatively tight engagement resists a relative rotary movement of the plunger and body.

The shape and dimensions of the member 24 or the equivalent check valve in the various forms of the device are such that the check valve may at times "bottom" on the inner face of the closure 9 of the tappet body. This occurs at times in the normal engine cycle as pointed out below and it may occur at other times as a result of the atcion of hard or resistant particles of foreign matter in the oil. If any hard particles or foreign matter lodge on the outer face of the member 18 or upon the check valve 23 in line with the outer face of the member 18, the check valve will be held open and there will thus be a momentary failure of the tappet to operate properly. When this occurs the plunger bottoms on the member 9 and is pressed and beats down on the dirt so lodged between the valve 23 and the opposed face of the member 18 until the dirt is broken up or so reduced in thickness that the check valve can again properly close. When that occurs the valve resumes its normal operation and the plunger and the entire cam assembly return to normal and correct operation.

The device is generally arranged in its various forms to provide for the escape of air from the system. In operation some air is inevitably drawn into the system and since it is readily compressible, its presence is disadvantageous and it is desirable to provide means for its discharge or leakage away from the interior of the hydraulic valve lifter or lash adjuster. Air entering the bore of the plunger may escape upwardly and outwardly through the clearance between the plunger wall 17 and the closure member 28 of Figure 2 or its equivalent part in the other figures. Air on its way to the interior of the plunger may escape upwardly along the clearance between the plunger 17 and the body 8. Should air be carried downwardly into the high compression space below the plunger, within the body 8, it will tend to return upwardly along the clearance between the plunger and the body. The valve 23 and its seat are positioned well below the point of contact of the plunger 17 with the body 8 and thus air which finds its way into the high compression space tends to move upwardly and to leak outwardly between the plunger and the body rather than to return into the space 34 through the opening between the check valve 23 and its seat.

Figure 5:
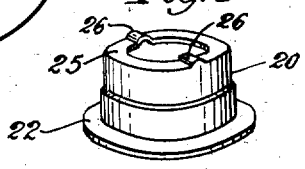
Figure 5 is a perspective view of the valve retainer removed from its position in the assembly.
Figure 8:
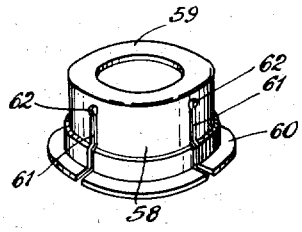
Figure 8 is a perspective view of a modified valve retainer.

The modified valve retainer as shown in Figure 8 is generally the same as that of Figure 5 except that it provides greater opening for the passage of oil from the supply chamber into the high pressure.

The retainer of Figure 8 is designated generally by the number 58 and is provided with a flange 59 which differs from the flange 25 of the retainer 20 by the absence of the members 26. The flange 60 corresponds generally to the flange 22 of the form of Figure 5. Cuts or openings 61 are formed in the sides of the retainer of Figure 8 and extend through a substantial portion of the height of the member and through the flange 60. They may terminate in enlarged portions 62 at their inner ends if desired.

Figure 9:
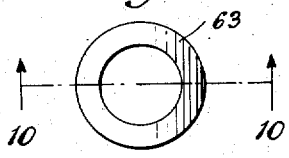
Figure 9 is a plan view of a modified view of a check valve spring.
Figure 10:
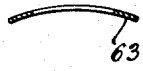
Figure 10 is a transverse section taken at line 10—10 of Figure 9.
Figure 7:
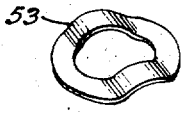
Figure 7 is a perspective view illustrating a spring washer removed from the assembly.

The check valve spring of Figures 9 and 10 differs from that of Figure 7 by the fact that it is formed on a single radius. The check valve spring of Figures 9 and 10 is designated by the numeral 63.

Figure 11:
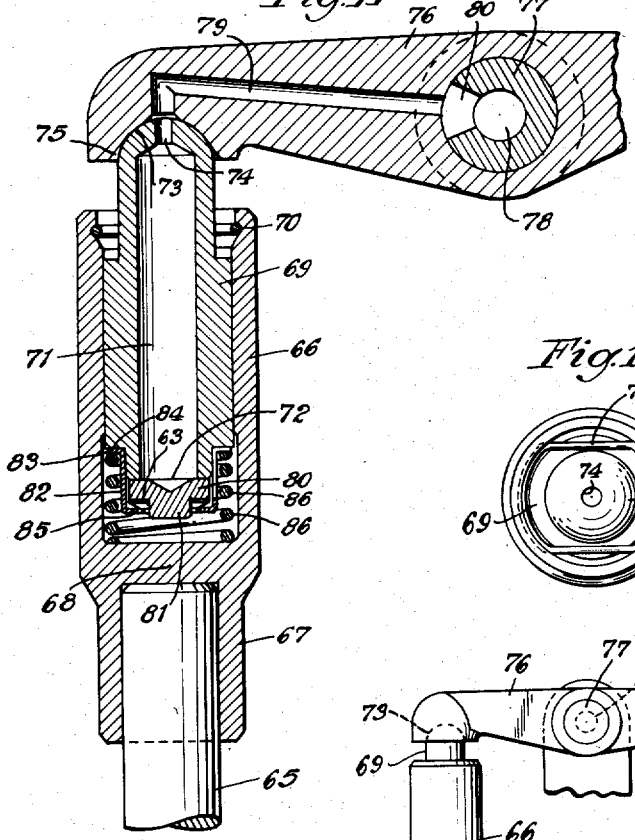
Figure 11 is a sectional view illustrating a modified form of the device in which the invention is embodied not in the tappet but in an adjuster positioned away from the cam.
Figure 13:
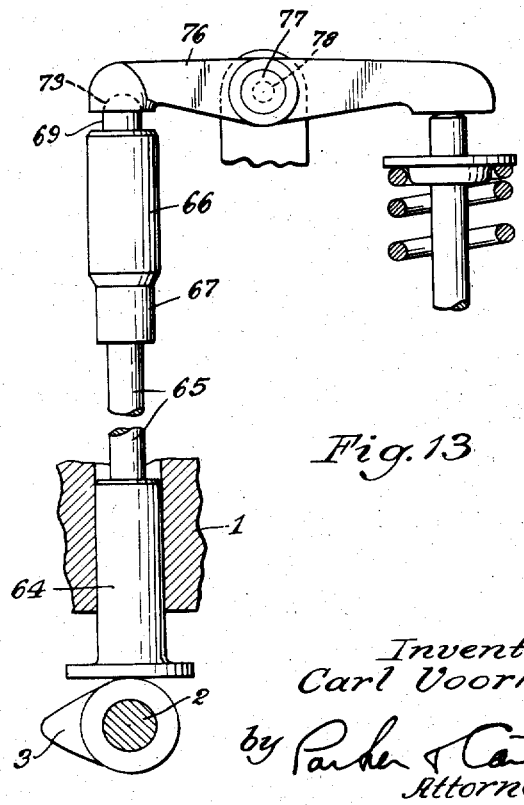
Figure 13 is a side elevation of the device of Figure 11 with parts omitted and shown on a reduced scale.

In the modified form of Figures 11 to 13 inclusive, the clearance or lash adjuster is positioned in the linkage between the rocker arm and the cam but is not embodied in the tappet. As shown particularly in Figure 13, a conventional tappet 64 may be used and operates in contact with the cam 3. A push rod 65 is engaged by the tappet 64 and moved by it.

The adjuster as shown in Figures 11 and 13 includes a body 66 of generally cylindrical portion which is provided with a hollow extension 67 within which is received the end of the push rod 65. The manner in which the push rod is engaged with or connected to the body 66 is immaterial and the two members may be connected for cooperation by any construction which is desired. An imperforate partition member 68 closes the bottom of the body 66.

Positioned within the body 66 is a hollow plunger 69. The plunger is held against displacement from the body 66 by a snap ring or other retaining member 70. The plunger itself is provided with a cylindrical cavity 71 which is open at its lower end as at 72.

At its upper end the plunger 69 is closed in part by a rounded member or portion 73 through which a passage or opening 74 is positioned. The portion 73 of the plunger is in the particular form shown in Figure 11 received within a socket 75 in one end of a rocker arm 76. A rocker arm is carried on a rocker shaft 77 which is hollow as at 78. The rocker arm is provided with a passage way 79 in communication with the interior 78 of the rocker arm 77 by means of a duct 80. The passage or duct 79 of the rocker arm communicates with the passage 74 of the plunger. The particular shaping and contacting features of the plunger and rocker arm are immaterial and these features may be of many constructions. It is sufficient for the purposes of this invention that the two cooperating members be so shaped that they may cooperate together adequately to supply oil to the interior of the plunger.

The arrangement of the parts at the lower or inner end of the plunger in the form of Figures 11 and 13 is substantially the same as that of Figures 2, 4, and 6. In each case there is a relatively flat valve, a valve retainer, a main helical spring outside of the retainer and a relatively flat spring within the retainer. Although these parts will be re-described with the modified form, they are substantially the same as those shown in the figures just mentioned and their purpose and operation are substantially the same as those above described.

80 is a check valve provided with an outwardly or downwardly extending boss 81. It is positioned within a retainer 82 which may be of the form shown in Figure 5 or of the form shown in Figure 8. The retainer case, the flange 83 which is seated against a shoulder 84 formed in the plunger 69, has also a flange 85 positioned to embrace the valve 80. A spring 63 like that shown in Figures 9 and 10 may be positioned within the retainer and between its flange 85 and the check valve 80. A spring of the type shown in Figure 7 might also be used and for some purposes which will be described below this relatively flat spring may be entirely omitted. A coiled spring 86 is positioned within the body 66. At one end it bears upon the member 68 and at the other end it bears against the flange 83 of the retainer, which flange is seated against the shoulder 84 of the plunger 69.

In each of the several forms of the invention, except that of Figures 11, 12 and 13, the cylindrical plunger is provided with a wide open bore. At one end it is closed, by a cap 28, 35 or 55, in Figures 2, 4 and 6 respectively. These caps are not sufficiently tight in the plunger to be fixed with respect to them. They are sufficiently loose, each in its respective bore, so that pressure on the inner face of the cap will not be effective to raise the plunger in which the cap is seated. The caps may thus be said to be free with respect to the plunger in which they are seated. Several advantages flow from this construction.

Thus the clearance between the cap and the plunger in which it is seated forms a controlled or restricted leakage to permit escape of air from the top portion of the supply chamber 34 or 48. The free fit of the cap in the plunger also permits a larger diameter for the chamber 34 or 48, since it may be bored from one end, in a simple operation, and the diameter of the bore 34 or 48 is thus limited only by the necessity for providing walls of the cylindrical plunger of sufficient thickness to provide sufficient strength for the operation of the device.

Another advantage resulting from the free mounting of the cap in the plunger is that the pressure exerted on the lower surface of the cap which results from any oil pressure generally in the oil chamber 34 or 48 is taken directly against the lower end of the push rod 30, 31 and does not act on the plunger 17. Thus the total force tending to operate the plunger 17 and the cylinder 8 in the outward direction is reduced by the amount of the pressure in the chamber 34 or 48 multiplied by the area in the lower face of the cap 28, 35 or 55 and the force tending to move the plunger 17 outwardly in the cylindrical body 8, is the sum of the force exerted by the coil spring and the effect of the oil pressure beneath the plunger.

The effect of this oil pressure is reduced by the fact that the caps 28 and 35 and 55 are loose and it is reduced to the extent of the pressure multiplied by the exposed area of the plunger.

In the form of Figure 6 a counter-bore is formed in the upper end of the plunger 46. Pressure leaking between the cap 55 and the inner face of the plunger 46 is exerted against the lower face of the flange 56. Therefore pressure within the space 48 is in the form of Figure 6 exerted not only against the inner surface of the cap within the plunger but it is exerted also upon the under-face of the flange 46 and thus further reduces the pressure on the plunger by the area of that part of the flange exposed by the counter-bore.

In an internal combustion engine where hydraulic adjustment of the valve gears is used that "pump up" where the valves are held open by the hydraulic device occurs mainly under two circumstances, namely, in some engines where the valve gear flats over the nose of the cam, and the other where the valve bounce occurs at the instant of the valve closing, although either or both of these may be beyond the possible speed of the engine. It is sometimes advantageous to cut off the oil feed to the hydraulic device when the valve is in the closed position, and sometimes more advantageous to cut off the oil feed when the valve is in the open position, depending upon the acceleration and deceleration of the cam operating the valve gear. Therefore, in order to teach the art to others, I find it necessary to disclose the type of oil feed which cuts off oil pressure in the lifted position of the valve of Figure 1 and another view which shows the oil supply cut off in the closed position (Figure 6). It may be necessary in some cases to cut off the oil feed at both the closing and open position of the engine valve and allow oil to enter the hydraulic device only at an intermediate position where the passage 6 and the groove 14 are so positioned that the groove 14 is below the passage 6 when the engine valve is seated and the groove 14 is above the passage 6 when the engine valve is open. In this case oil can enter the tappet body 15 only at a point between the open and closed position of the engine valve. The valve closed position is shown in Figure 15 and the valve open position is shown in Figure 16.

The condition shown in Figure 14 is that which occurs when the engine is stopped and the large valve is in the open position and the tappet has leaked down to the full extent of the plunger travel. In that condition, the plunger has bottomed and the check valve is supporting the load with the valve portion 24 bearing against the inner face of the portion 9 of the body 8. A dual rate spring 21' is used.

Starting noise is one of the problems connected with the use of hydraulic adjustment of valve gear. Therefore, there is disclosed in Figure 8 an alternate design of the valve retaining cage to provide very ample opening for fluid to pass the valve to permit starting without undue noise in the valve gear (Figure 8).

*The terms "spring washer" and "washer spring" to define the shape of the check valve spring are well known in the spring industry and their meaning as used herein is illustrated by the catalogues and circulars of the various manufacturers.*

I claim:

1. In a hydraulic valve lifter, a cylindrical member closed at one end, a hollow plunger slideably mounted therein, the said plunger provided with an opening in its inner end, and with means to admit liquid to its interior, a check valve mounted to close said opening, said check valve being positioned at the inner end of said plunger in such manner as to touch the bottom of the closed end of the cylindrical member when the said plunger is at the bottom of its inward travel with respect to said cylinder, and a retainer positioned on said plunger and about and beneath a portion of said check valve, a portion of said check valve shaped to extend beyond said retainer, and a coil spring positioned within said cylindrical member bearing against its closed end and bearing also against said plunger.

2. In a hydraulic valve lifter, a cylindrical member closed at one end, a hollow plunger slideably mounted therein, the said plunger provided with an opening in its inner end, and with means to admit liquid to its interior, a check valve mounted to close said opening, said check valve being positioned at the inner end of said plunger in such manner as to touch the bottom of the closed end of the cylindrical member when the said plunger is at the bottom of its inward travel with respect to said cylinder, and a retainer positioned on said plunger and about said check valve, a portion of said check valve shaped to extend beyond said retainer, a washer spring positioned within said retainer, and a coil spring positioned within said cylindrical member bearing against its closed end and bearing also against said plunger.

3. In a hydraulic valve lifter, a cylindrical member closed at one end, a hollow plunger slideably mounted therein, the said plunger provided with an opening in its inner end, and with means to admit liquid to its interior, a check valve mounted to close said opening, said check valve being positioned at the inner end of said plunger in such manner as to touch the bottom of the closed end of the cylindrical member when the said plunger is at the bottom of its inward travel with respect to said cylinder, and a retainer positioned on said plunger and about said check valve, a portion of said check valve shaped to extend beyond said retainer, a washer spring positioned within said retainer and biased to close said check valve, and a coil spring positioned within said cylindrical member bearing against its closed end and bearing also against said plunger.

4. In a hydraulic valve lifter, a cylindrical member closed at one end, a hollow plunger slideably mounted therein, the said plunger provided with an opening in its inner end, and with means to admit liquid to its interior, a check valve mounted to close said opening, said check valve being positioned at the inner end of said plunger in such manner as to touch the bottom of the closed end of the cylindrical member when the said plunger is at the bottom of its inward travel with respect to said cylinder, and a coil spring positioned within said cylindrical member bearing against its closed end and bearing also against said plunger, the coils of said coil spring being arranged to provide a dual rate of operation for said spring.

5. In a hydraulic valve lifter, a cylindrical member closed at one end, a hollow plunger slideably mounted therein, the said plunger provided with an opening in its inner end, and with means to admit liquid to its interior, a check valve mounted to close said opening, said check valve being positioned at the inner end of said plunger in such manner as to touch the bottom of the closed end of the cylindrical member when the said plunger is at the bottom of its inward travel with respect to said cylinder, and a retainer positioned on said plunger and about said check valve, a portion of said check valve shaped to extend beyond said retainer, a washer spring positioned within said retainer and biased to close said check valve and a coil spring positioned within said cylindrical member bearing against its closed end and bearing also against said plunger, the coils of said coil spring being arranged to provide a dual rate of operation for said spring.

6. A hydraulic lash adjuster comprising a cylinder closed at one end, a hollow plunger slidably mounted therein, a non-return valve at the inner extremity of said plunger closing to form a pressure chamber between the inner end of said hollow plunger and said cylinder, a spring washer biased to urge said valve to the closed position, a spring positioned within said cylinder and against its closed end and said plunger, biased to move said plunger outward in said cylinder and said spring having a dual rate.

7. A hydraulic valve tappet comprising a hollow member closed at one end, a tubular member of more than one diameter both externally and internally slidably mounted therein, and means for admitting liquid to said tubular member, a check valve positioned to close the inner extremity of said tubular member and to limit the inward travel of said tubular member, said tubular member closed at its outer end by a cap having a socket therein to receive a push rod, said tubular member being urged outward by a spring within said hollow member having a dual rate depending upon the degree of compression of said spring.

8. A hydraulic valve lash adjuster comprising a hollow cylinder closed at one end, a hollow plunger forming a fluid supply chamber mounted therein, said plunger closed at its inner end by a non-return valve mounted on said plunger, said valve shaped to crush any foreign particles which may settle upon the valve seat members and render the valve inoperative, and yielding means biased to move said plunger away from the closed end of said cylinder.

9. In a hydraulic lash adjuster a hollow cylinder, a hollow plunger mounted therein, a fluid port at the inner extremity of said plunger, a valve controlling said port to open and close the latter under the influence of a Venturi action and pressure differential, and a washer spring positioned to assist in closing said valve, said valve positioned to bottom in the cylinder when the plunger is at its greatest inward travel, and yielding means biased to move said plunger away from the closed end of said cylinder.

10. In combination in a hydraulic valve clearance regulator, a hollow cylinder closed at one end, a hollow plunger slidably mounted therein, means for admitting liquid to the interior of said plunger, said plunger having a reduced portion at its inner end terminating in a flat surface, a flat check valve closing the hollow plunger at said flat surface, said valve held in position by a retainer cage, said valve arranged to bottom in said hollow cylinder and said plunger urged outward in said cylinder by a spring having a dual rate and said spring holding said valve retainer cage in operating position, and yielding means biased to move said plunger away from the closed end of said cylinder.

11. In combination in a hydraulic valve clearance regulator, a hollow cylinder closed at one end, a hollow plunger slidably mounted therein, means for admitting liquid to the interior of said plunger, said plunger having a reduced portion at its inner end terminating in a flat surface, a flat check valve closing the hollow plunger at said flat surface, said valve held in position by a retainer cage, said valve arranged to bottom in said hollow cylinder and said plunger urged outward in said cylinder by a spring having a dual rate and said spring holding said valve retainer cage in operating position, and a washer spring positioned between said cage and said valve, and biased to close said valve.

12. In a hydraulic valve lifter, a hollow cylinder closed at one end, a plunger slidably mounted therein, a spring interposed between said plunger and said cylinder and biased to urge the plunger away from the closed end of the cylinder, said spring having a dual rate of action, means within the plunger defining a passage to the area within said cylinder, and a check valve for said passage.

13. In a hydraulic valve lifter, a hollow cylinder closed at one end, a plunger mounted within said cylinder for relative reciprocation, yielding means interposed between said plunger and said cylinder and biased to urge the plunger away from the closed end of the cylinder, the plunger and the closed end of the cylinder defining between them a compression space, means within the plunger defining a passage to said compression space, a check valve for said passage and a washer spring biased to move said check valve to seating position.

14. In a hydraulic valve lifter, a hollow cylinder closed at one end, a plunger mounted within said cylinder for relative reciprocation, the plunger and the closed end of the cylinder defining between them a compression space, means within the plunger defining a passage to said compression space, a check valve for said passage and a washer spring biased to move said check valve to seating position, and a spring positioned within said cylinder and biased to move said plunger away from the closed end of said cylinder, said spring having a dual rate.

15. In a hydraulic valve lifter, a cylindrical member closed at one end, a hollow plunger slidably mounted therein, the said plunger provided with an opening in its inner end, and with means to admit liquid to its interior, a check valve mounted to close said opening, said check valve being positioned at the inner end of said plunger in such manner as to touch the bottom of the closed end of the cylindrical member when the said plunger is at the bottom of its inward travel with respect to said cylinder, and a retainer positioned on said plunger and about and beneath a portion of said check valve, a portion of said check valve shaped to extend beyond said retainer, and a coil spring positioned within said cylindrical member bearing against its closed end and bearing also against said plunger, the portion of said retainer positioned beneath said check valve having an offset portion defining a passage beneath said check valve and retainer.

*16. A hydraulic valve lifter as defined by claim 13, further characterized by the fact that the check valve is a relatively flat valve, that the check valve and lower end of the plunger are surrounded by a sheet metal valve retainer and that the washer spring is supported by the sheet metal retainer.*

*17. A hydraulic valve lifter as defined by claim 13, further characterized in that the lower end of the plunger is of reduced diameter and the washer spring is supported from said reduced diameter portion thereof.*

References Cited in the file of this patent or the original patent

UNITED STATES PATENTS

| | | |
|---|---|---|
| 404,284 | Johnson | May 28, 1889 |
| 2,109,815 | Best | Mar. 1, 1938 |
| 2,158,222 | Dayton | May 16, 1939 |
| 2,203,952 | Eshbaugh | June 11, 1940 |
| 2,438,631 | Bergmann | Mar. 30, 1948 |
| 2,468,332 | Johnson | Apr. 26, 1949 |
| 2,595,583 | Johnson | May 6, 1952 |
| 2,599,886 | Bergmann | June 10, 1952 |
| 2,645,215 | Moser | July 14, 1953 |
| 2,654,356 | Oldberg | Oct. 6, 1953 |
| 2,682,864 | Voorhies | July 6, 1954 |

FOREIGN PATENTS

| | | |
|---|---|---|
| 988,202 | France | Apr. 25, 1951 |

OTHER REFERENCES

"Spring Washers," Wallace Barnes Co., Division of Associated Spring Corporation.